(12) United States Patent
Abrahamsson et al.

(10) Patent No.: US 9,420,601 B2
(45) Date of Patent: Aug. 16, 2016

(54) METHOD AND ARRANGEMENTS FOR SCHEDULING TRANSMISSION RESOURCES WITH VARIABLE GUARD INTERVALS

(75) Inventors: Richard Abrahamsson, Knivsta (SE); David Astely, Bromma (SE); Jacobus Haartsen, Bg Hardenberg (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1388 days.

(21) Appl. No.: 12/532,334

(22) PCT Filed: Nov. 20, 2007

(86) PCT No.: PCT/SE2007/050870
§ 371 (c)(1),
(2), (4) Date: Sep. 21, 2009

(87) PCT Pub. No.: WO2008/127165
PCT Pub. Date: Oct. 23, 2008

(65) Prior Publication Data
US 2010/0103892 A1   Apr. 29, 2010

(30) Foreign Application Priority Data

Apr. 11, 2007   (SE) ........................................ 0700901

(51) Int. Cl.
*H04W 72/12*   (2009.01)
*H04W 72/08*   (2009.01)

(52) U.S. Cl.
CPC ................................ *H04W 72/1231* (2013.01)

(58) Field of Classification Search
CPC ............ H04W 72/0446; H04W 72/06; H04W 72/1231
USPC .......................................... 370/280, 329, 330
See application file for complete search history.

(56) References Cited

U.S. PATENT DOCUMENTS 6,434,128 B1 * 8/2002 Benz et al. ..................... 370/329
8,009,622 B2 * 8/2011 Asplund et al. ............... 370/329
(Continued)

FOREIGN PATENT DOCUMENTS

DE   198 08 371 A1   9/1999
EP   1511190 A1   2/2005
(Continued)

OTHER PUBLICATIONS

"TDD/FDD E-UTRA commonality aspects of the reduced latency DL reference signal for FDD E-UTRA", 3GPP TSG RAN WG1 #47bis, R1-070122, Jan. 15-19, 2007, pp. 1-10.*
"Idle symbol position in half-duplex communications with the generic frame structure", 3GPP TSG RAN WG1 R1-063277, pp. 1-4, Nov. 6-10, 2006.*
(Continued)

*Primary Examiner* — Scott M Sciacca
(74) *Attorney, Agent, or Firm* — Patent Portfolio Builders PLLC

(57) ABSTRACT

Method and arrangements for scheduling transmission resources in a first node in a cell comprised within a wireless communication network. The first node is arranged to communicate over a communication channel with at least one user equipment within the cell. The communication is made by using a frame comprising uplink resources and downlink resources with a switching point between the downlink resources and the uplink resources. The method comprises the step of obtaining a parameter referring to the expected transmission quality of the communication and/or the expected coherence properties of the communication channel. The method also comprises scheduling a transmission on an uplink or downlink resource. The resource is located on a time distance from the switching point. The time distance is based on the obtained parameter.

16 Claims, 5 Drawing Sheets

(56) References Cited

U.S. PATENT DOCUMENTS

| | | | |
|---|---|---|---|
| 2005/0041605 A1* | 2/2005 | Benson | 370/280 |
| 2005/0094605 A1* | 5/2005 | Sun et al. | 370/337 |
| 2006/0133323 A1* | 6/2006 | Obuchi et al. | 370/335 |
| 2007/0104149 A1* | 5/2007 | Khan et al. | 370/334 |
| 2007/0121538 A1* | 5/2007 | Ode et al. | 370/323 |
| 2007/0155387 A1* | 7/2007 | Li et al. | 455/441 |
| 2008/0123571 A1* | 5/2008 | Zhu et al. | 370/294 |
| 2010/0110917 A1* | 5/2010 | Che | H04B 7/2656 370/252 |

FOREIGN PATENT DOCUMENTS

| | | |
|---|---|---|
| EP | 1873989 A1 | 1/2008 |
| EP | 1921785 A1 | 5/2008 |
| WO | 2004/004138 A2 | 1/2004 |
| WO | 2007023913 A1 | 3/2007 |

OTHER PUBLICATIONS

International Search Report for PCT/SE2007/050870 dated Sep. 5, 2008.

International Preliminary Report on Patentability for PCT/SE2007/050870 dated Jun. 2, 2009.

Supplementary/Extended European Search Report issued in corresponding International Application No. PCT/SE2007/050870 completed Mar. 21, 2011.

Povey, G., et al., "A Review of Time Division Duplex-CDMA Techniques", Spread Spectrum Techniques and Applications, 1998, Proceedings, 1998, IEEE 5th International Symposium on Sun City, South Africa, Sep. 2-4, 1998, New York, NY, USA, IEEE, US, vol. 2, Sep. 2, 1998, pp. 630-633, XP010307626, entire document.

Official Action mailed on Jun. 17, 2011 in corresponding Mexican Patent Application No. MX/a/2009/010692.

* cited by examiner

METHOD AND ARRANGEMENTS FOR SCHEDULING TRANSMISSION RESOURCES WITH VARIABLE GUARD INTERVALS

TECHNICAL FIELD

The described embodiments relate to methods and arrangements in a wireless communication network. In particular it relates to a method and arrangements for scheduling transmission resources in a node in a cell comprised within a wireless communication network.

BACKGROUND

Two-way radio communication systems commonly use either frequency division duplexing (FDD) or time division duplexing (TDD). The frequency division duplexing approach uses well separated frequency bands in order to avoid interference between uplink and downlink transmissions, whereas with the time division duplexing approach, so called TDD, uplink and downlink traffic are transmitted in the same frequency band or adjacent frequency bands, but in different time intervals. A benefit of the time division duplexing mode of operation is that paired well separated frequency bands are not required.

In the Long Term 3G Evolution (LTE) telecommunication technology, bandwidth flexibility and flexibility of spectrum allocation are two of the key features. In order to utilize also unpaired frequency bands it has been decided that at least one time division duplexing mode should be supported. However time based duplexing also imposes challenges that do not emerge in frequency based duplexing.

In order for transmissions not to interfere with each other, the transmissions in adjacent areas need to be synchronized in some sense.

Further, guard periods, or idle periods, during which no signal is transmitted, need to be introduced in the switching between downlink and uplink in TDD mode communication. One reason for this is the need to allow the equipment in the base stations and the mobiles to switch their circuits between transmission mode and receive mode.

Another reason, which puts stronger requirements on the duration of the guard periods under most circumstances, is that when a base station or mobile is switched from transmission mode to receive mode, signals from other base stations or mobiles are still propagating in the air, causing significant interference. Depending on e.g. the cell size and inter-base station distance, the duration of the guard period length needed differs.

As an example, elevated base stations even 80 km away, corresponding to a propagation delay of about 0.27 ms, may give interference above the noise floor after a downlink to uplink switch. With aggregation of downlink transmissions from several base stations even further away, the interference level may be very significant and may influence reception in a negative way.

Thus, in order to avoid interference in time division duplexing mode communication, guard periods are introduced around switches between uplink and downlink. There could potentially also be other reasons for not allowing transmission involving specific mobiles or base stations during certain time periods.

The guard periods may be the same for the whole network, even if it is not necessarily so. Transmissions must not be scheduled to use any part of the guard periods. Thus transmissions are only scheduled for outside the guard periods. The transmission quality of a communication and/or coherence properties of a communication channel between the base station and the user equipment may differ, depending on a plurality of unwanted influence on the signal and the radio propagation conditions. Some non limiting examples of such unwanted influence may be thermal noise and interference and a non limiting example of phenomena that adversely affect the propagation conditions are path loss, signal multipath, and Doppler spread. Further the accuracy of channel estimation will affect the transmission quality.

A guard period may be created by having no transmissions on some of the data symbols at the end of a sub-frame. A similar truncation may be done at the beginning of a sub-frame. At some stage, however, it will be necessary to remove also some reference symbols, or pilots, used for channel estimation, in order to create sufficient idle periods. This inevitably results in less accurate channel estimates. Redundant information in data symbols or reference symbols that both may be helpful are truncated away. This is a problem in particular for mobile nodes that have a channel that de-correlates fast over time and/or frequency, so that only very recent reference symbols at neighbouring frequencies carry usable information about the channel at the location of the data symbols, and for mobile nodes with poor channel quality or low signal to noise ratio (SNR).

SUMMARY

It is therefore an object to obviate at least some of the above mentioned disadvantages and provide a mechanism that improves the scheduling in a wireless communication network.

The object is achieved by a method for scheduling transmission resources in a first node in a cell comprised within a wireless communication network. The first node is arranged to communicate over a communication channel with at least one user equipment within the cell. The communication is made by using a frame comprising uplink resources and downlink resources with a switching point between the downlink resources and the uplink resources. The method comprises the step of obtaining a parameter referring to the expected transmission quality of the communication and/or the expected coherence properties of the communication channel. The method also comprises scheduling a transmission on an uplink or downlink resource. The resource is located on a time distance from the switching point. The time distance is based on the obtained parameter.

In accordance with the present invention, the object is also achieved by an arrangement for scheduling transmission on resources in a first node in a cell comprised within a wireless communication network. The first node is arranged to communicate over a communication channel with at least one user within the cell. The communication is made by using a frame comprising uplink resources and downlink resources with a switching point between the downlink resources and the uplink resources. The arrangement comprises an obtaining unit adapted to obtain a parameter referring to the expected transmission quality of the communication and/or the expected coherence properties of the communication channel. Further, the arrangement comprises a scheduling unit adapted to schedule a transmission on an uplink or downlink resource, located on a time distance from the switching point. The time distance is based on a parameter referring to the expected transmission quality of the communication and/or the expected coherence properties of the communication channel between the first node and the at least one user equipment.

In accordance with the present invention, the object is also achieved by an arrangement for scheduling transmission resources in a in a control node comprised within a wireless communication network. The control node is connected to a first node. The first node is arranged to communicate over a communication channel with at least one user equipment within a cell. The communication is made by using a frame comprising uplink resources and downlink resources with a switching point between the downlink resources and the uplink resources. The arrangement comprises an obtaining unit adapted to obtain a parameter referring to the expected transmission quality of the communication and/or the expected coherence properties of the communication channel. Further, the arrangement comprises a scheduling unit adapted to schedule a transmission on an uplink or downlink resource, located on a time distance from the switching point. The time distance is based on a parameter referring to the expected transmission quality of the communication and/or the expected coherence properties of the communication channel between the first node and the at least one user equipment.

Since the transmission resources are scheduled to different user equipments such that the truncation of reference symbols due to guard periods is avoided for user equipment which experience bad channel conditions, or bad transmission quality in general, and/or whose channel vary on a short time and/or frequency scale, the performance loss incurred by introducing guard periods is reduced and an overall better system performance is achieved.

BRIEF DESCRIPTION OF THE DRAWINGS

The present invention will now be described more in detail in relation to the enclosed drawings, in which.

DETAILED DESCRIPTION

The invention is defined as a method and an arrangement which may be put into practice in the embodiments described below.

Figure 1:
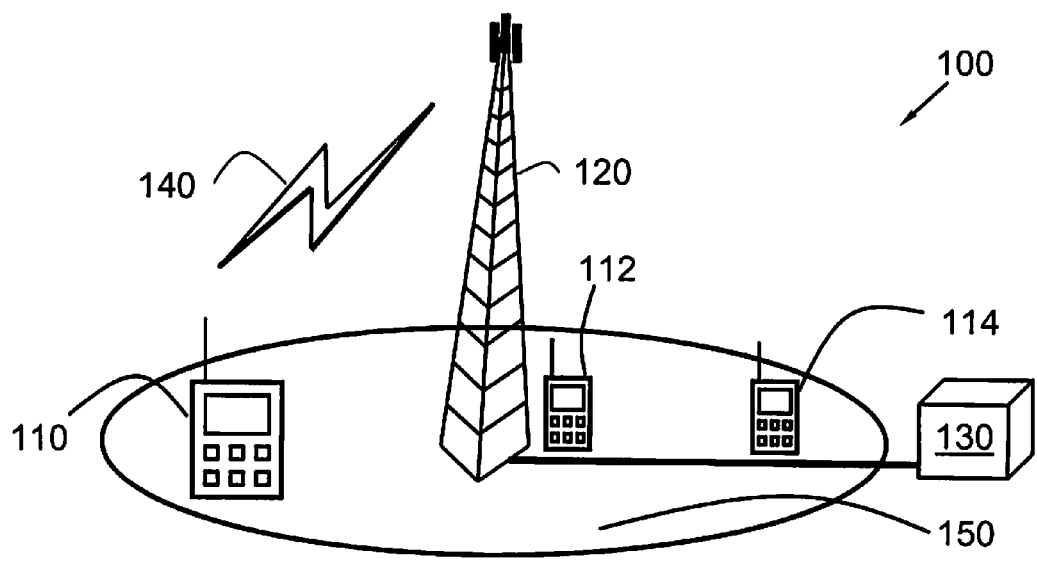
FIG. 1 is a block diagram illustrating embodiments of a wireless communication network.

FIG. 1 depicts a first node 120 communicating with at least one user equipment 110, 112, 114 in a wireless communication network 100. The communication between the first node 120 and the at least one user equipment 110, 112, 114 may be made e.g. over a communication channel 140 in a cell 150 comprised in the wireless communication network 100. The wireless communication network 100 may also comprise a control node 130. The control node 130 may be e.g. a Radio Network Controller. The Radio Network Controller 130 is a governing element in the wireless communication network 100, responsible for control of base stations e.g. the first node 120, which are connected to the Radio Network Controller 130. The Radio Network Controller 130 may carry out radio resource management; some of the mobility management functions and is a point where encryption/decryption may be done before user data is sent to/from the at least one user equipment 110, 112, 114.

In some embodiments, the first node 120 may be a base station, a wireless communications station, a fixed station, a control station, a repeater or any similar arrangement for radio communication. The at least one user equipment 110, 112, 114 may in some embodiments be e.g. a mobile cellular radiotelephone, a Personal Digital Assistant (PDA), a laptop, a computer or any other kind of device capable of communicate radio resources.

However, in the example depicted in FIG. 1, the first node 120 is a base station and the at least one user equipment 110, 112, 114 is a mobile cellular radiotelephone.

The wireless communication network 100 may be based on technologies such as e.g. LTE, Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) etc.

Further, the wireless communication network 100 according to the present solution is with advantage working in time division duplex mode.

In order to create the necessary guard periods according to some embodiments, whole sub frames may be scheduled for no transmission prior to, or just after, a downlink to uplink switch. As an example, a sub frame may be a 1 ms part of a 10 ms radio frame. However, to limit throughput losses, it is also desirable to limit the guard periods to smaller parts of a sub frame, e.g. one or several symbols.

The transmission resources at the first node 120 are scheduled by a method in the first node 120. As an example, the scheduling may take place in a base station 120. According to some embodiments, the scheduling may be performed partly in the radio network controller 130 and partly in the base station 120. In some embodiments, the scheduling may be performed entirely in the radio network controller 130.

Figure 2:
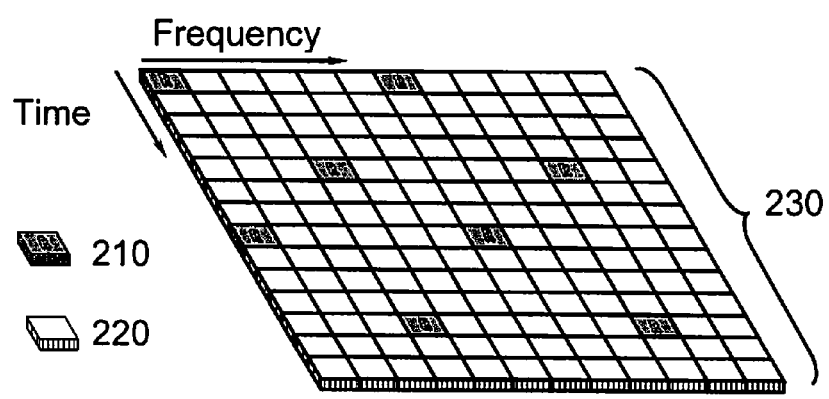
FIG. 2 is a block diagram illustrating embodiments of a resource block.

FIG. 2 illustrates the Long Term Evolution Reference symbol location for a single downlink resource block, assuming a single transmit antenna, used by the at least one user equipment 110, 112, 114 and the first node 120. In order to use coherent demodulation pilot symbols 210, sometimes referred to as reference symbols or reference signals, e.g. used for channel estimation, are transmitted multiplexed with the data 220. As an example for the Long Term Evolution standard, the Orthogonal Frequency Division Multiplexing (OFDM) reference symbol pattern in FIG. 2 is used for downlink when only one transmit antenna is used.

A guard period may be created by having no transmissions on some of the symbols 210 or 220 at the end of the sub-frame 230. When creating the guard period, it will at some point be necessary to remove also some of the reference symbols 210 in order to create idle periods of sufficient duration in time. Thus some reference symbols 210 at the end of the sub-frame 230 are truncated.

Figure 3:
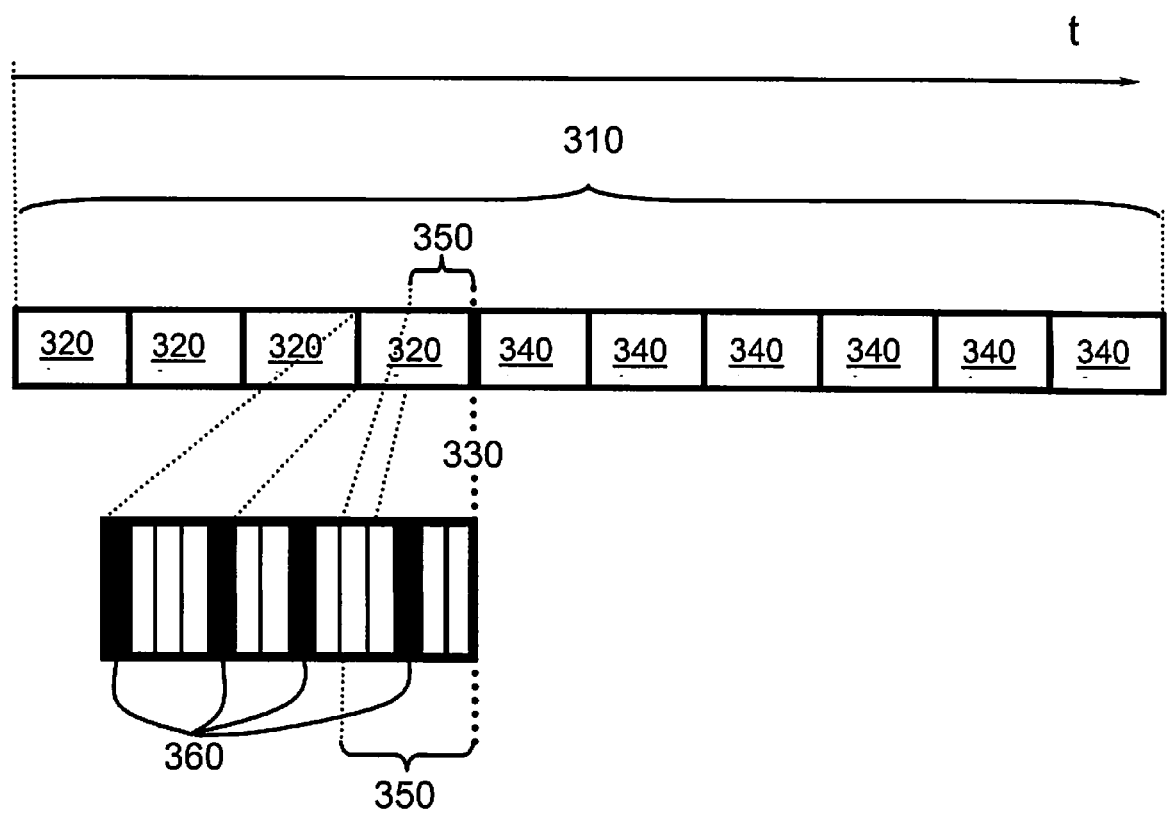
FIG. 3 is a block diagram illustrating embodiments of a radio frame structure.

In FIG. 3 is the time dimension of an embodiment of a possible Long Term Evolution time division duplexing radio frame 310 illustrated. The radio frame 310 according to the illustrated embodiment comprises four downlink resources e.g. sub frames 320 followed by six uplink resources e.g. sub-frames 340. The resources 320, 340 may typically be a sub-frame, but may also be of another granularity according to some embodiments. Between the downlink resources 320 and the uplink resources 340 is a switching point 330 situated. The resources 320, 340 may comprise reference symbols or pilots 360, as previously explained.

Also, it is illustrated in FIG. 3 how a guard period 350 between downlink and uplink transmission allocations, where the switching point 330 is situated, may be created by truncating, as a non limiting example only, e.g. 1-5 reference symbols 360 and leaving the downlink-transmitter idle during the guard period 350. The guard period 350 may according to some embodiments be e.g. 71.4-357 microseconds. The guard period 350 may be situated in association with the switching point 330, e.g. just before or just after the switching point 330.

When the at least one user equipment 110, 112, 114 is mobile, it may experience high Doppler spread, which may lead to that the channel de-correlates over a short time period. Hence, information of the channel carried by previous reference symbols 360 quickly becomes outdated and only the most recent reference symbols 360 may be used for channel estimation. In such a case, truncating the reference symbol 360 in the third last symbol slot of a downlink resource 320, in the increased image of a downlink resource 320 in FIG. 3, will significantly increase the probability of erroneous detection of the preceding OFDM symbols.

A user equipment 110, 112, 114 with a low Doppler spread however experiences a channel that varies on a significantly slower basis. Hence, earlier reference symbols 360 may carry sufficient channel information for reliable channel estimation. Moreover, reference symbols 360 recorded during earlier sub frames scheduled to the same user carry significant information, that may be used in the channel estimation. In such contexts, the loss of the last reference symbol 360 has less impact on the probability of correct detection.

Thus, it is more costly for a high mobility user equipment 110, 112, 114 travelling with a high speed, to have its reference symbols 360 removed than for a low mobility user equipment 110, 112, 114. Consequently, it is advantageous to schedule a user equipment 110, 112, 114 with high speed or high Doppler spread in parts of the radio frame where there is no need to remove reference symbols 210 and instead schedule a user equipment 110, 112, 114 with slowly varying channel in the truncated resources 320, 340.

If there are several high mobility user equipments 110, 112, 114 in the cell 150, they may, according to some embodiments, be scheduled also based on their delay spread so that user equipments 110, 112, 114 with a small coherence bandwidth are scheduled at locations where reference symbol 360 removal is not employed. User equipments 110, 112, 114 whose channels do not de-correlate over larger bandwidths are less harmed by reference symbol truncation as also reference symbols 360 at more distant frequencies may be used for channel estimation.

Finally, a user equipment 110, 112, 114 experiencing low Signal-to-Noise Ratio conditions, like when being close to the cell edge, may preferably not be scheduled in truncated resources 320, 340. Apart from the performance loss by reduced number of reference symbols and reduced total reference signal energy, the forward-error-correction capability may be limited in shorter resources 320, 340.

In order to implement a scheduling scheme based on mobile speed, Doppler spread, delay spread and/or path loss, these parameters, directly related parameters such as coherence time, coherence bandwidth, and/or signal-to-noise-and-interference ratio, or estimates thereof, is required to be known to the scheduler.

The Doppler spread, delay spread, and path loss or the related parameters may either be, estimated and tracked in the base station 120, based on uplink reference signals, channel sounding signals, or random access signals or based on other measurements, or they may be estimated and tracked in the at least one user equipment 110, 112, 114 based on downlink reference signals 360 or other measurements and fed back to the base station 120 along with other data or separately. According to some embodiments, the Doppler spread, delay spread, and path loss may either be, estimated and tracked in the control node 130.

Doppler spread, delay spread, and signal to noise ratio or path loss are parameters that also may be useful for a channel estimation algorithm and may thus already be available.

According to the invention, transmissions are scheduled based on the mobile speed, Doppler spread, the delay spread, and/or path loss; or related properties such as coherence time, coherence bandwidth and/or Signal-to-Noise Ratio or measurements or estimates thereof.

In principle, if any of the at least one user equipments 110, 112, 114 experience bad transmission quality of the communication and/or coherence properties of the communication channel (140), or is expected to do so, or has a channel that de-correlates over short periods of time, or that de-correlates fast with changing frequency, it should not be scheduled in resources 320, 340 where truncation takes place. Such user equipment 110, 112, 114 will benefit most from the extra reference symbols 360 in the resources 320, 340, and may therefore be allocated a resource 320, 340 located further away from the downlink-uplink switching point 330 where truncation may take place to create idle periods, also called guard periods 350.

Figure 4:
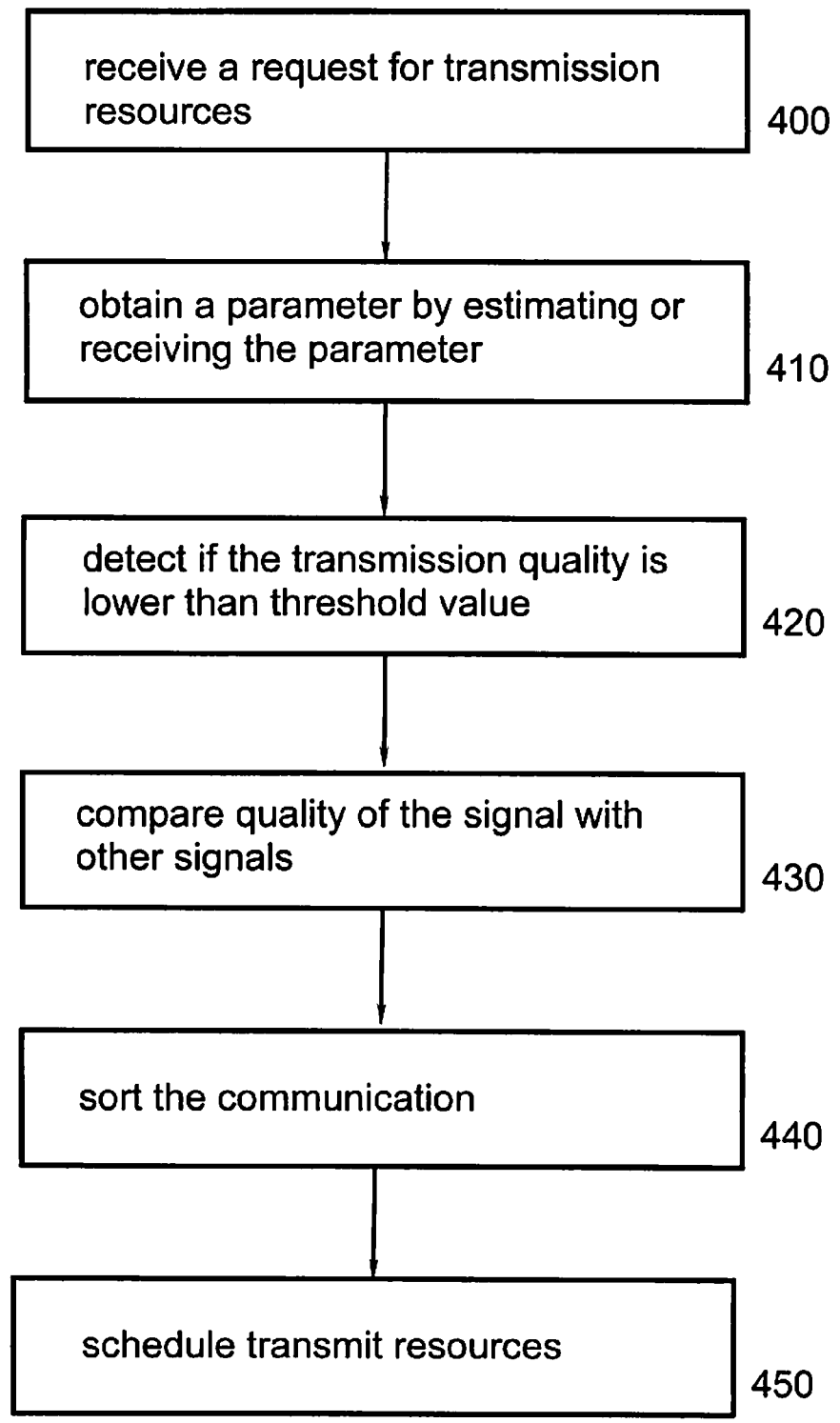
FIG. 4 is a flow chart illustrating embodiments of method steps.

FIG. 4 is a flowchart illustrating a method for scheduling transmission resources 320, 340 in a first node 120 in a cell 150 comprised within a wireless communication network 100. The first node 120 is arranged to communicate with at least one user equipment 110, 112, 114 within the cell 150. The communication is by means of a frame 310 comprising uplink resources 340 and downlink resources 320 with a switching point 330 between the downlink resources 320 and the uplink resources 340. The resources 320, 340 may be e.g. sub frames such as uplink sub frames and/or downlink sub frames. The method comprises the steps of:

Step 400

According to some embodiments, the base station 120 receives a request for transmission resources, e.g., from higher layers or the at least one user equipment 110, 112, 114 in order to make communication possible between the first node 120 and the at least one user equipment 110, 112, 114.

Step 410

The base station 120 obtains a parameter referring to the expected transmission quality of the communication and/or the expected coherence properties of the communication channel 140. The communication comprise at least one radio signal. According to some embodiments, the step of obtaining a parameter is performed by estimating the transmission quality of the communication and/or coherence properties of the communication channel 140 between the first node 120 and the at least one user equipment 110, 112, 114. According to some embodiments of the invention, the step of estimating the transmission quality of the communication and/or coherence properties of the communication channel 140 may be performed in the first node 120.

In some embodiments, the transmission quality of the communication and/or coherence properties of the communication channel 140 between the first node 120 and the at least one user equipment 110, 112, 114 may be based on an estimated parameter, or a plurality of estimated parameters, related to the transmission quality of the communication and/or or coherence properties of the communication channel 140, such as e.g. mobile speed, Doppler spread, delay spread, coherence time, coherence bandwidth, Signal-to-Noise Ratio or path-loss, or a combination thereof.

Further, the estimation of the transmission quality of the communication and/or coherence properties of the communication channel 140 may according to some embodiments be based on e.g. an uplink reference signal, a channel sounding signal or a random access signal between the first node 120 and the at least one user equipment 110, 112, 114.

However, according to some embodiments, an estimation of the transmission quality of the communication and/or coherence properties of the communication channel 140 between the first node 120 and the at least one user equipment 110, 112, 114 may instead be performed in the at least one user equipment 110, 112, 114. According to those embodiments, the step of obtaining 410 a parameter referring to the expected transmission quality of the communication and/or the expected coherence properties of the communication channel 140 further may be performed by receiving an estimation of a expected transmission quality of the communication and/or the expected coherence properties of the communication channel 140 between the first node 120 and the at least one user equipment 110, 112, 114, from another node. The other node may be e.g. another user equipment 110, 112, 114. The other node may according to some embodiments be a control node 130.

Step 420

In some embodiments, the base station 120 detects that the transmission quality of the communication and/or coherence properties (q) of the communication channel 140 between the first node 120 and the at least one user equipment 110, 112, 114 is lower than a predetermined threshold value (δ). The optional step 420 is only performed according to some embodiments of the method. The predetermined threshold value (δ) may be set in advance e.g. by the operator of the wireless communication network 100. As previously mentioned, the transmission quality of the communication and/or coherence properties (q) of the communication channel 140 may be measured in a magnitude such as e.g. mobile speed, Doppler spread, delay spread, coherence time, coherence bandwidth, Signal-to-Noise Ratio or path-loss, or a combination of any, some or even all the above mentioned measurements. Thus, e.g.:

IF q<δ THEN low transmission quality/low correlation property ELSE OK transmission quality/OK correlation property However, according to some embodiments, a detection is made whether if the transmission quality of the communication and coherence properties (q1, q2, q3) of the communication channel 140 sent between the first node 120 and the at least one user equipment 110, 112, 114 is lower than a compound threshold value (δ), comprising a predetermined plurality of threshold values (δ1, δ2, δ3). This may be illustrated e.g. by:

IF f(q1, q2, q3)<δ THEN low transmission quality/low correlation property ELSE OK transmission quality/OK correlation property Where f(q1, q2, q3) is an arbitrary cost function. The optional step of detecting 420 that the transmission quality of the communication and/or coherence properties (q) of the communication channel 140 between the first node 120 and the at least one user equipment 110, 112, 114 is lower than a predetermined threshold value (δ) may according to some embodiments be used e.g. to determine whether a truncated resource, such as e.g. a sub frame, may be used, for a single user within the cell 150.

Step 430

In some embodiments, the base station 120 compares the transmission quality of the communication and/or coherence properties of the communication channel 140 between the first node 120 and the at least one user equipment 110, 112, 114 with the transmission quality of other communications and/or coherence properties of other channels between the first node 120 and other instances of the at least one user equipment 110, 112, 114. The optional step of comparing 430 the transmission quality of the communication and/or coherence properties of the communication channel 140 with the transmission quality of other communications and/or coherence properties of other channels may, according to some embodiments, be performed when a plurality of user equipment 110, 112, 114, is present simultaneously within a cell 150.

Step 440

In some embodiments, the base station 120 sorts the communication between the first node 120 and the at least one user equipment 110, 112, 114 in order of precedence in comparison with other communication and/or the coherence properties of the channel 140 established by the first node 120. This sorting and comparison is depending on the transmission quality of the communication and/or coherence properties of the communication channel 140. Thus the transmission quality of the communication and/or coherence properties of the communication channel 140 between the first node 120 and the at least one user equipment 110, 112, 114 is related to that of other instances of the at least one user equipment 110, 112, 114 competing for the same first node 120 resources. The user equipment 110, 112, 114 with poorer radio signal conditions and/or weaker channel correlation properties may accordingly be scheduled where no truncation of pilots or reference symbols 360 is necessary and the at least one user equipment 110, 112, 114 which have better radio signal conditions, such as transmission quality of the communication and/or coherence properties of the communication channel, may have its pilots or reference symbols 360 truncated with less performance loss.

Step 450

The base station 120 schedules a transmission on an uplink or downlink resource 320, 340 located on a time distance from the switching point 330. The time distance is based on the obtained parameter. The scheduling is performed in order to reduce performance loss due to guard periods 350.

The scheduling 450 may be based on at least one parameter referring to the expected transmission quality of the communication and/or coherence properties of the communication channel 140, or, according to some embodiments, estimated or measured transmission quality of the communication and/or coherence properties of the communication channel 140 between the first node 120 and the at least one user equipment 110, 112, 114.

As previously mentioned, the transmission quality of the communication and/or coherence properties of the communication channel 140 may be measured in a magnitude such as e.g. mobile speed, Doppler spread, delay spread, coherence time, coherence bandwidth, Signal-to-Noise Ratio or path-loss, or a combination of some or even all the above mentioned measurements.

According to some embodiments, the step of scheduling 450 is performed such that the at least one user equipment 110, 112, 114 with bad transmission quality of the communication and/or weak coherence properties of the communication channel is not scheduled 450 in resources 320, 340 where truncation take place.

The described method according to at least some of the described steps 400-450 may according to some embodiments be performed in a first node 120 represented by a base station.

The described method according to at least some of the described steps 400-450 may according to some embodiments be performed in a first node 120 represented by a controlling node such as e.g. a Radio Network Controller.

The described method according to at least some of the described steps 400-450 may according to some embodiments be performed in a first node 120 represented by a user equipment, such as e.g. a mobile communication device.

According to some embodiments, a method in a unit 120 of a cellular telecommunication network 100 is provided. The method comprises the step of scheduling transmission resources to different users 110, 112, 114, in order to reduce performance loss due to guard periods 350. Also, the method comprises, according to some embodiments, basing the scheduling on parameters such as either mobile speed, Doppler spread, delay spread, coherence time, coherence bandwidth, Signal-to-Noise Ratio or path-loss, or a combination thereof.

According to some embodiments, the method comprises the further step of related measuring of channel parameters, to obtain the parameters; mobile speed, Doppler spread, delay spread, coherence time, coherence bandwidth, Signal-to-Noise Ratio or path-loss.

According to some embodiments, the method comprises the further step of estimating some, or all, of the parameters; mobile speed, Doppler spread, delay spread, coherence time, coherence bandwidth, Signal-to-Noise Ratio or path-loss.

According to some embodiments, the method may comprise the further step of basing the parameter estimates/measurements on up-link reference signals, channel sounding signals or random access signals. The method may further comprise the step of tracking said parameters in a base station 120, according to some embodiments.

The method may however alternatively comprise the step of tracking, based on measurements, the parameters in a mobile unit 110, 112, 114, according to some embodiments. Further, the method may, according to some embodiments comprise receiving said parameters in a base station 120, along with other necessary control information or along with other data or separately.

Figure 5:
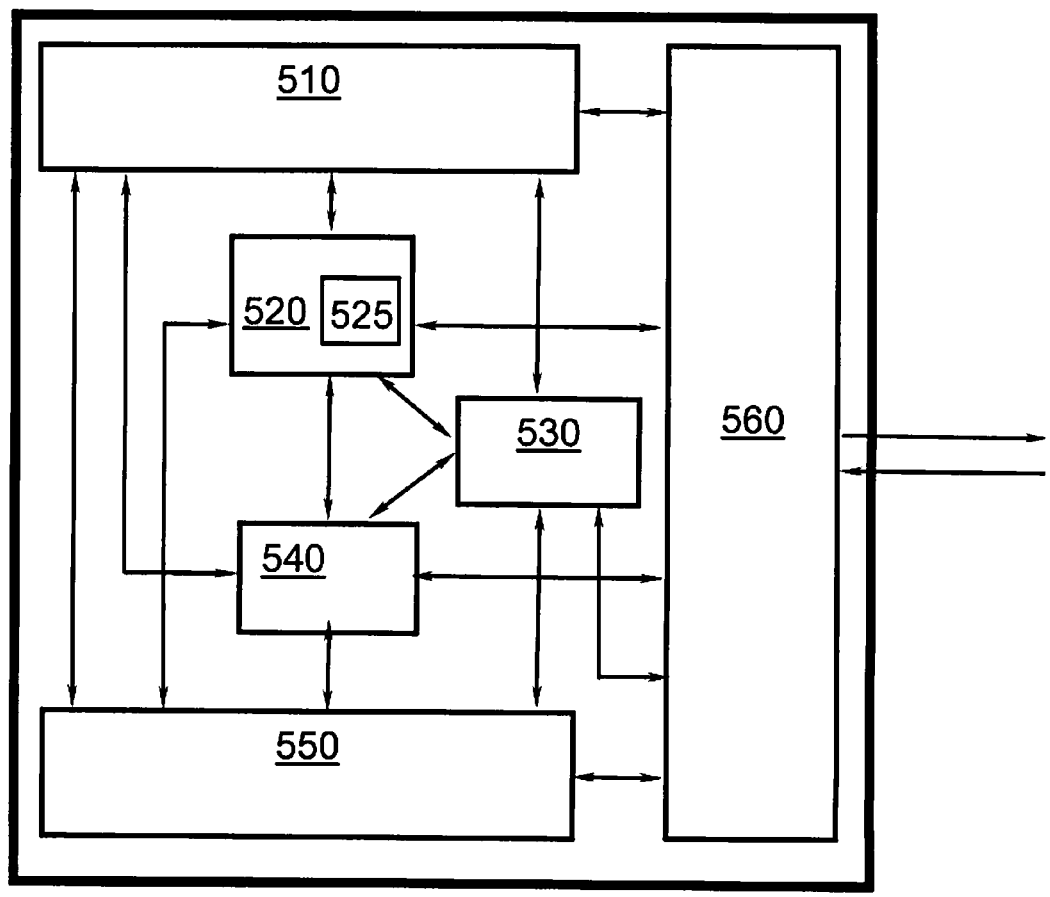
FIG. 5 is a block diagram illustrating embodiments of an arrangement in a first node.

FIG. 5 is a block diagram illustrating an arrangement 500 for scheduling transmission resources in a first node 120. The first node 120 is comprised in a cell 150 within a wireless communication network 100. The first node 120 is arranged to communicate with at least one user equipment 110, 112, 114 within the cell 150. The communication may be performed by sending a signal between the first node 120 and the at least one user equipment 110, 112, 114. The communication is further performed by using a frame 310 comprising uplink resources 340 and downlink resources 320 with a switching point 330 between the downlink resources 320 and the uplink resources 340. The resources 320, 340 may be e.g. sub frames such as uplink sub frames and/or downlink sub frames.

The first node arrangement 500 comprises a scheduling unit 510. The scheduling unit 510 is adapted to schedule a transmission on an uplink or downlink resource 320, 340 located on a time distance from the switching point. The time distance is based on a parameter referring to the expected transmission quality of the communication and/or the expected coherence properties of the communication channel 140 between the first node 120 and the at least one user equipment 110, 112, 114.

The scheduling is thus based on at least one parameter referring to the transmission quality of the communication and/or coherence properties of the communication channel 140 sent between the first node 120 and the at least one user equipment 110, 112, 114, in order to reduce performance loss due to guard periods 350.

Also, the first node arrangement 500 further comprises an obtaining unit 520 adapted to obtain a parameter referring to the expected transmission quality of the communication and/or coherence properties of the signal and/or the communication channel 140.

The obtaining unit 520 may according to some embodiments comprise an estimation unit 525. The estimation unit 525 may be adapted to estimate the transmission quality of the communication and/or coherence properties of the communication channel 140 between the first node 120 and the at least one user equipment 110, 112, 114.

The first node arrangement 500 may further, according to some embodiments, comprise a receiving unit 560 adapted to receive a request for transmission resources, e.g., from higher layers or from the user equipment 110, 112, 114.

The first node arrangement 500 may according to some embodiments comprise a detection unit 530. The detection unit 530 is adapted to detect if the transmission quality of the communication and/or coherence properties of the communication channel 140 between the first node 120 and the at least one user equipment 110, 112, 114 is lower than a predetermined threshold value.

Further, the first node arrangement 500 may, according to some embodiments, comprise a comparison unit 540. The comparison unit 540 is adapted to compare the transmission quality of the communication and/or coherence properties of the communication channel between the first node 120 and the at least one user equipment 110, 112, 114 with the transmission quality of communication and/or coherence properties of the communication channel between the first node 120 and other instances of the user equipment 110, 112, 114.

Further yet, the arrangement 500 may, according to some embodiments, comprise an organization unit 550 adapted to sort the communication between the first node 120 and the at least one user equipment 110, 112, 114 in order of precedence, in comparison with the other communication established by the first node 120 with other instances of the user equipment 110, 112, 114, depending on the transmission quality of the communication and/or coherence properties of the communication channel 140.

Some, several or all of the previously described units i.e. the scheduling unit 510, the estimation unit 520, the detection unit 530, the comparison unit 540 the organization unit 550 and the receiving unit 560 may, according to some embodiments be comprised within the same physical unit. They may however also be comprised within separate physical units.

Thus a network unit 120, in a telecommunication system 100 is provided. The network unit 120 is characterized by means for performing the steps of the previously described method.

The arrangement may according to some embodiments be comprised in a first node 120 represented by a base station.

The arrangement may according to some embodiments be comprised in a first node 120 represented by a control node, such as e.g. a Radio Network Controller.

Figure 6:
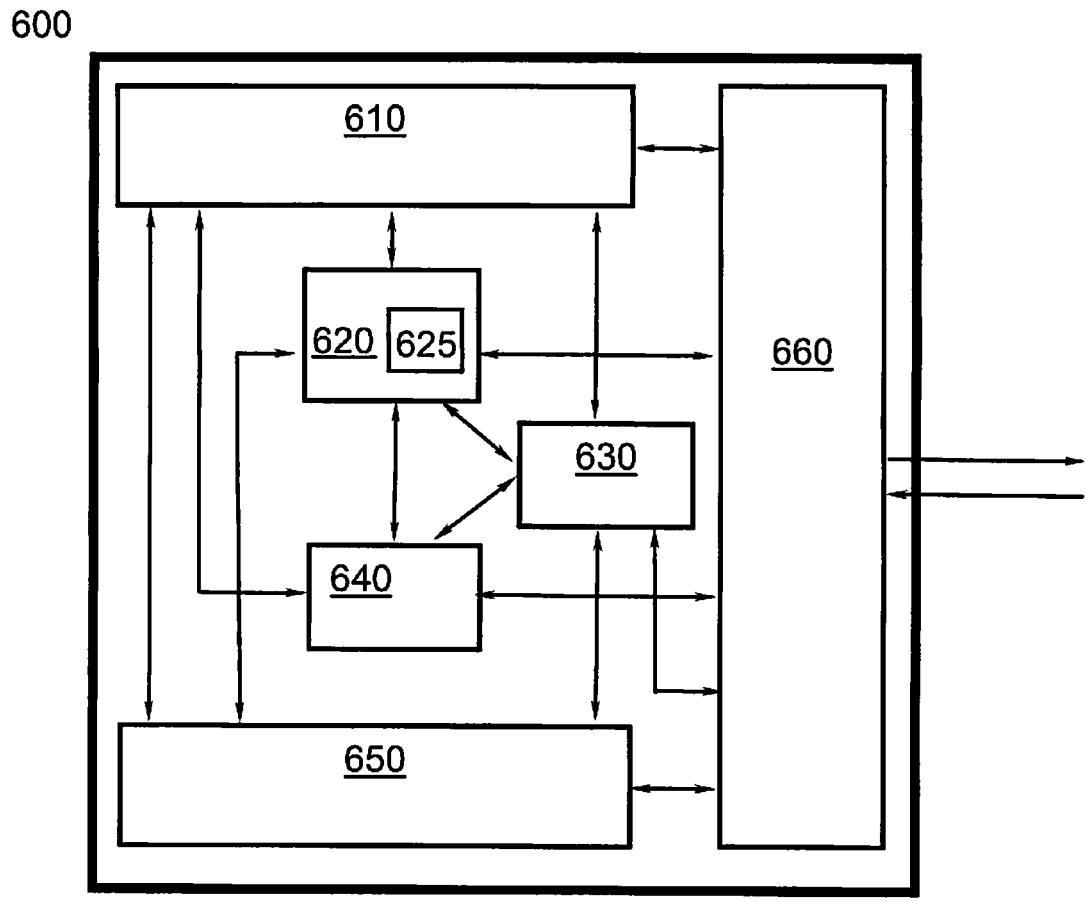
FIG. 6 is a block diagram illustrating embodiments of an arrangement in a control node.

FIG. 6 illustrates an arrangement 600 for scheduling transmission resources in a control node 130 comprised within a wireless communication network 100, wherein said control node 130 is connected to a first node 120. The first node 120 is arranged to communicate with at least one user equipment 110, 112, 114 within a cell 150. The communication is performed by a frame 310 comprising uplink resources 340 and downlink resources 320 with a switching point 330 between the downlink resources 320 and the uplink resources 340. The resources 320, 340 may be e.g. sub frames such as uplink sub frames and/or downlink sub frames.

The arrangement 600 comprises a receiving unit 660 adapted to receive information from the first node 120 concerning the at least one user equipment 110, 112, 114. Further, the arrangement 600 comprises an obtaining unit 620 adapted to obtain a parameter referring to the expected transmission quality of the communication and/or the expected coherence properties of the communication channel 140 between the first node 120 and the at least one user equipment 110, 112, 114.

The arrangement 600 comprises a scheduling unit 610. The scheduling unit 610 is adapted to schedule a transmission on an uplink or downlink resource 320, 340 located on a time distance from the switching point. The time distance is based on a parameter referring to the expected transmission quality of the communication and/or the expected coherence properties of the communication channel 140 between the first node 120 and the at least one user equipment 110, 112, 114.

According to some embodiments, the control node arrangement 600 further comprises an estimation unit 625, adapted to estimate the transmission quality of the communication and/or coherence properties of the communication channel 140 between the first node 120 and the at least one user equipment 110, 112, 114.

According to some embodiments, the control node arrangement 600 further comprises a comparison unit 640, adapted to compare the transmission quality of the communication and/or coherence properties of the communication channel between the first node 120 and the at least one user equipment 110, 112, 114 with the transmission quality of the communication and/or coherence properties of the communication channel between the first node 120 and other instances of the user equipment 110, 112, 114.

According to yet some embodiments, the control node arrangement 600 further comprises an organization unit 650 adapted to sort the communication between the first node 120 and the at least one user equipment 110, 112, 114. The sorting is made in order of precedence in comparison with other communication established by the first node 120, depending on the transmission quality of the communication and/or coherence properties of the communication channel 140.

According to still some embodiments, the control node arrangement 600 further comprises a detection unit 630, adapted to detect that the transmission quality of the communication and/or coherence properties of the communication channel 140 between the first node 120 and the at least one user equipment 110, 112, 114 is lower than a predetermined threshold value.

Some, several or all of the previously described units i.e. the scheduling unit 610, the estimation unit 620, the detection unit 630, the comparison unit 640 the organization unit 650 and the receiving unit 660 may, according to some embodiments be comprised within the same physical unit. They may however also be comprised within separate physical units.

Thus a network unit 130, in a telecommunication system 100 is provided. The network unit 130 is characterized by means for performing the steps of the previously described method.

The methods for scheduling transmission resources according to the present invention may be implemented through one or more processors, such as the processor 520 in the base station arrangement 500 depicted in FIG. 5, or the processor 620, in the control node arrangement 600 depicted in FIG. 6, together with computer program code for performing the functions of the present method. The program code mentioned above may also be provided as a computer program product, for instance in the form of a data carrier carrying computer program code for performing the method according to the present invention when being loaded into the base station 120 and/or the user equipment 110 and/or the control node 130. The data carrier may be a CD ROM disc, a memory stick, or any other medium such as a disk or tape that can hold machine readable data. The computer program code may furthermore be provided as pure program code on a server and downloaded to the base station 120 and/or user equipment 110 and/or the control node 130 remotely.

Computer program code for carrying out the scheduling of transmission resources according to the present invention discussed herein may be written in a high-level programming language, such as Java, C, and/or C++, for development convenience. In addition, computer program code for carrying out operations of embodiments of the present invention may be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

While the methods and arrangements described in this document are susceptible to various modifications and alternative forms, specific embodiments thereof are shown by way of example in the drawings and are herein described in detail. It should be understood, however, that there is no intent to limit the present methods and arrangements to the particular forms disclosed, but on the contrary, the present methods and arrangements are to cover all modifications, equivalents, and alternatives falling within the spirit and scope of the methods and arrangements as defined by the claims.

Further by means of example and in order to simplify the comprehension concerning transmission quality, the term SNR has been consistently used in this text when describing a Signal to noise Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (S/N), Signal to Noise and Interference Ratio (SIR), Signal to Noise and Interference Ratio (SNIR), Signal to Interference and Noise Ratio (SINR), Carrier to Interference Ratio (CIR) or an inversion of the ratio, like Interference to Signal Ratio, (ISR). Any of these or similar ratios may be used in the context of this description instead of the SNR.

Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it may be directly connected or coupled to the other element or intervening elements may be present.

Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which these methods and arrangements belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For purposes of illustration, embodiments of the present methods and arrangements are described herein in the context of a user equipment 110, a base station 120 and a control node 130. It will be understood, however, that the present method and arrangements are not limited to such embodiments and may be embodied generally as any electronic device that includes radio signal propagation means thereon, or is connected to another electronic device that includes radio signal propagation means thereon.

The invention claimed is:

1. A method for scheduling transmission resources in a wireless communication network, wherein a first node is arranged to communicate over a communication channel with at least one user equipment within a cell, by using a frame comprising uplink resources and downlink resources with a switching point between the downlink resources and the uplink resources, wherein truncation of pilots/reference symbols takes place, resulting in loss or removal of some pilots/reference symbols, to create a guard period situated in association with the switching point, the method comprising:
    obtaining a parameter referring to an expected transmission quality of the communication and/or expected coherence properties of the communication channel, and;
    scheduling a transmission on an uplink or downlink resource, located on a time distance from the switching point, which time distance is based on the obtained parameter and on how the truncation of pilots/reference symbols impacts the performance loss of the transmission,
    wherein scheduling resources to the at least one user equipment is performed such that the at least one user equipment with transmission quality of the communication channel and/or coherence properties of the communication channel below at least one predetermined threshold value is not scheduled in resources where truncation take place.

2. The method according to claim 1, wherein obtaining the parameter referring to the expected transmission quality of the communication and/or the expected coherence properties of the communication channel comprises estimating the expected transmission quality of the communication and/or the expected coherence properties of the communication channel between the first node and the at least one user equipment.

3. The method according to claim 2, wherein the estimation of the transmission quality of the communication and/or coherence properties of the communication channel is based on either an uplink reference signal, a channel sounding signal or a random access signal between the first node and the at least one user equipment.

4. The method according to claim 1, further comprising:
    comparing the transmission quality of the communication and/or the coherence properties of the communication channel between the first node and the at least one user equipment with the transmission quality of other communications and/or the coherence properties of other communication channels between the first node and other instances of the user equipment, and;
    sorting the communication between the first node and the at least one user equipment, in order of precedence in comparison with other communications established by the first node, depending on the transmission quality of the communication and/or coherence properties of the communication channel.

5. The method according to claim 1, further comprising:
    detecting that the transmission quality of the communication and/or coherence properties of the communication channel between the first node and the at least one user equipment is lower than a predetermined threshold value.

6. The method according to claim 1, wherein the transmission quality of the communication and/or coherence properties of the communication channel between the first node and the at least one user equipment is estimated based on a parameter including either coherence time, coherence bandwidth, or Signal-to-Noise Ratio, or related parameters including mobile speed, Doppler spread, delay spread, or path-loss, or a combination thereof.

7. The method according to claim 1, wherein obtaining the parameter referring to the expected transmission quality of the communication and/or the expected coherence properties of the communication channel comprises receiving an estimation of a transmission quality of the communication and/or coherence properties of the communication channel between the first node and the at least one user equipment, from another node.

8. The method according to claim 1, wherein the method is performed in the first node.

9. The method according to claim 1, wherein the method is performed in a control node.

10. A first node for scheduling transmission resources, the first node comprised within a wireless communication network, wherein said first node is arranged to communicate with at least one user equipment within a cell, by using a frame comprising uplink resources and downlink resources with a switching point between the downlink resources and the uplink resources, wherein truncation of pilots/reference symbols takes place, resulting in loss or removal of some pilots/reference symbols, to create a guard period situated in association with the switching point, the first node comprising a memory configured to store program instructions and a processor configured to execute the program instructions when loaded into the processor, the processor configured to:
    obtain a parameter referring to the expected transmission quality of the communication and/or the expected coherence properties of the communication channel, and;
    schedule the at least one user equipment on resources located a time distance from the switching point, which time distance is based on the parameter referring to the expected transmission quality of the communication and/or the expected coherence properties of the communication channel between the first node and the at least one user equipment and on how the truncation of pilots/reference symbols impacts the performance loss of the communication/channel between the first node and the at least one user equipment, wherein scheduling resources to the at least one user equipment is performed such that the at least one user equipment with transmission quality of the communication channel and/or coherence properties of the communication channel below at least one predetermined threshold value is not scheduled in resources where truncation take place.

11. The first node according to claim 10, wherein the processor is further configured to:
estimate the transmission quality of the communication and/or coherence properties of the communication channel between the first node and the at least one user equipment, and;
compare the transmission quality of the communication and/or coherence properties of the communication channel between the first node and the at least one user equipment with the transmission quality of the communication and/or coherence properties of other communication channels between the first node and other instances of the at least one user equipment, and;
sort the communication between the first node and the at least one user equipment in order of precedence in comparison with other communications established by the first node, depending on the transmission quality of the communication and/or coherence properties of the communication channel.

12. The first node according to claim 10, wherein the processor is further configured to:
detect if the transmission quality of the communication and/or coherence properties of the communication channel between the first node and the at least one user equipment is lower/weaker than a predetermined threshold value.

13. The first node according to claim 10, wherein the first node is a base station.

14. A control node for scheduling transmission resources, the control node comprised within a wireless communication network, wherein said control node is connected to a first node, which first node is arranged to communicate with at least one user equipment within a cell, by using a frame comprising uplink resources and downlink resources with a switching point between the downlink resources and the uplink resources, wherein truncation of pilots/reference symbols takes place, resulting in loss or removal of some pilots/reference symbols, to create a guard period situated in association with the switching point, the control node comprising a memory configured to store program instructions and a processor configured to execute the program instructions when loaded into the processor, the processor configured to:
obtain a parameter referring to the expected transmission quality of the communication and/or the expected coherence properties of the communication channel between the first node and the at least one user equipment, and;
schedule a transmission on an uplink or downlink resource located on a time distance from the switching point, which time distance is based on the parameter referring to the expected transmission quality of the communication and/or the expected coherence properties of the communication channel between the first node and the at least one user equipment and on how the truncation of pilots/reference symbols impacts the performance loss of the communication/channel between the first node and the at least one user equipment,
wherein scheduling resources to the at least one user equipment is performed such that the at least one user equipment with transmission quality of the communication channel and/or coherence properties of the communication channel below at least one predetermined threshold value is not scheduled in resources where truncation take place.

15. The control node according to claim 14, wherein the processor is further configured to:
estimate the transmission quality of the communication and/or coherence properties of the communication channel between the first node and the at least one user equipment, and;
compare the transmission quality of the communication and/or coherence properties of the communication channel between the first node and the at least one user equipment with the transmission quality of the communication and/or coherence properties of other communication channels between the first node and other instances of the at least one user equipment, and;
sort the communication between the first node and the at least one user equipment in order of precedence in comparison with other communications established by the first node, depending on the transmission quality of the communication and/or coherence properties of the communication channel.

16. The control node according to claim 14, wherein the processor is further configured to:
detect if the transmission quality of the communication and/or coherence properties of the communication channel between the first node and the at least one user equipment is lower than a predetermined threshold value.

* * * * *